United States Patent [19]

Kepley

[11] Patent Number: 5,499,291
[45] Date of Patent: Mar. 12, 1996

[54] ARRANGEMENT FOR AUTOMATING CALL-CENTER AGENT-SCHEDULE-NOTIFICATION AND SCHEDULE-ADHERENCE FUNCTIONS

[75] Inventor: Garry D. Kepley, Boulder, Colo.

[73] Assignee: AT&T Corp., Murray Hill, N.J.

[21] Appl. No.: 4,387

[22] Filed: Jan. 14, 1993

[51] Int. Cl.$^6$ .............................. H04M 3/00; H04M 3/22; H01J 31/00; G06F 9/00
[52] U.S. Cl. ............................ 379/265; 379/34; 379/309; 395/161; 395/650
[58] Field of Search ............................ 379/34, 265, 266, 379/309; 395/155, 161, 650

[56] References Cited

U.S. PATENT DOCUMENTS

| 4,807,154 | 2/1989 | Scully et al. | 395/161 |
| 4,988,209 | 1/1991 | Davidson et al. | 370/58.2 |
| 5,111,391 | 5/1992 | Fields et al. | 364/401 |
| 5,289,368 | 2/1994 | Jordan et al. | 379/113 X |

FOREIGN PATENT DOCUMENTS

| 0318428 | 5/1989 | European Pat. Off. . |
| 4253460 | 9/1992 | Japan . |
| 9207318 | 4/1992 | WIPO . |

OTHER PUBLICATIONS

P. Laurin et al., *AT&T's Operator Services Position Systems (OSPS): Opportunities in Enhancing Operator Services*, Proc. Int. Telecomm. Symposium, Sep. 23, 1987, (Tappei, Taiwan), pp. 69–81.

R. Rose et al., *Automatic Call Distribution Using the ISDN Basic Rate Interface*, International Conference on Communications, Jun. 23, 1991, vol. 2, 1991, pp. 969–971.

ACD Software Makers, Teleconnect (Dec. 1989), 87–104 (see p. 94).

Cybernetics EMPS Reports Package, Cybernetics Systems International, 1–33.

Cybernetics EMPS, The Forecasting, Scheduling and Workforce Management Solution, Cybernetics Systems International.

EMPS Product Overview.

EMPS Specifications.

EMPS Information Flow.

Rod Jennings, et al., *EMPS: A Management Tool for Airline Reservations Networks*, Airline Executive, (date unknown), 39–41.

Gustavo Agusti, *The Secret to Smart Staffing*, Inbound/Outbound Magazine, (Dec. 1989), 64–65.

Primary Examiner—Jeffery Hofsass
Assistant Examiner—Harry S. Hong
Attorney, Agent, or Firm—David Volejnicek

[57] ABSTRACT

A call-management system (14) for a call center (FIG. 1) having a plurality of terminals (12) staffed by agents (13) includes a program-implemented arrangement (24) for communicating each agent's schedule to the agent via the agent's corresponding terminal and for monitoring the agent's adherence to the communicated schedule via the agent's corresponding terminal, thereby relieving a supervisor (19) of having to perform these functions. Other programs (25–27) that enable the supervisor to automatically communicate with the agents via their terminals are also included in the call-management system.

26 Claims, 4 Drawing Sheets

ARRANGEMENT FOR AUTOMATING CALL-CENTER AGENT-SCHEDULE-NOTIFICATION AND SCHEDULE-ADHERENCE FUNCTIONS

TECHNICAL FIELD

This invention relates to call-center operations.

BACKGROUND OF THE INVENTION

Call centers, such as emergency-services dispatch centers, telemarketing sales centers, customer-service centers, and other automatic call-distribution centers, employ large numbers of human agents to place and/or answer calls. For proper, efficient, and smooth center operation, work schedules must be developed for agents, the schedules must be communicated to the agents, and the agents' adherence to the schedules must be monitored. Presently, some or all of these activities are done manually, by center supervisors. This is slow, inefficient, and consumes an inordinate amount of the supervisors' time which could be better-spent on other activities.

Call centers are typically low-margin, high-volume operations, and therefore even small improvements in efficiency can have a significant effect on the centers' commercial viability. Realizing this, suppliers of call-center systems have automated some of these activities to make them more efficient and to unload the supervisors of their burden. Thus, call-management systems, which monitor call-center activity and issue reports thereon to the supervisor, have been introduced. Also introduced have been scheduling systems, which generate agent schedules based upon the reports generated by the call-management systems. While these advances have considerably improved the efficiency of call-center operations, further advances continue to be sought.

SUMMARY OF THE INVENTION

This invention is directed to meeting these and other needs of the prior art. I have recognized that a significant hindrance to the efficiency of call-center operations is the fact that the tasks of communicating agent schedules to the agents and of monitoring the agents' adherence to these schedules continue to be performed by human call-center supervisors in largely a manual manner. Therefore, according to the invention, there is provided an arrangement which automates these functions. Specifically according to the invention, there is provided an arrangement which communicates with the agents via their telecommunication terminals to advise them of their schedules and to monitor their adherence thereto. Illustratively, the arrangement is incorporated into the call-management system of the call-center, in order to share therewith, and thereby avoid unnecessary duplication of, the call-management system's existing capabilities.

According to an illustrative embodiment of the invention, in a call center that has a plurality of telecommunications terminals staffed by agents, each event of an agent's schedule which includes predetermined events—such as breaks—scheduled for predetermined times is communicated at its scheduled time to the agent via that agent's corresponding terminal. Then the agent's performance of the communicated event at the scheduled time is monitored via the agent's input—such as pressing of the appropriate key—into that agent's corresponding terminal. Preferably, this functionality is obtained by means of execution of stored programs in a call-management system of the call center. Also preferably, other programs that facilitate communications between a call center supervisor and the agents are likewise stored and executed in the call-management system.

The invention frees the call center supervisor from having to communicate schedules and schedule events to agents and from monitoring the agents' adherence to the schedules. It automatizes these functions, making their performance more exact and efficient. It provides the supervisor with a capability to communicate with the agents through their terminals. And when implemented as programs executing in the call center's call-management system, the invention is easy and inexpensive to implement and to retrofit, adds no additional hardware to the call center, and advantageously makes use of capabilities already provided by the call-management center so as to avoid their duplication.

These and other advantages and features of the invention will become more apparent from the following description of an illustrative embodiment of the invention taken together with the drawing.

DETAILED DESCRIPTION

Figure 1:
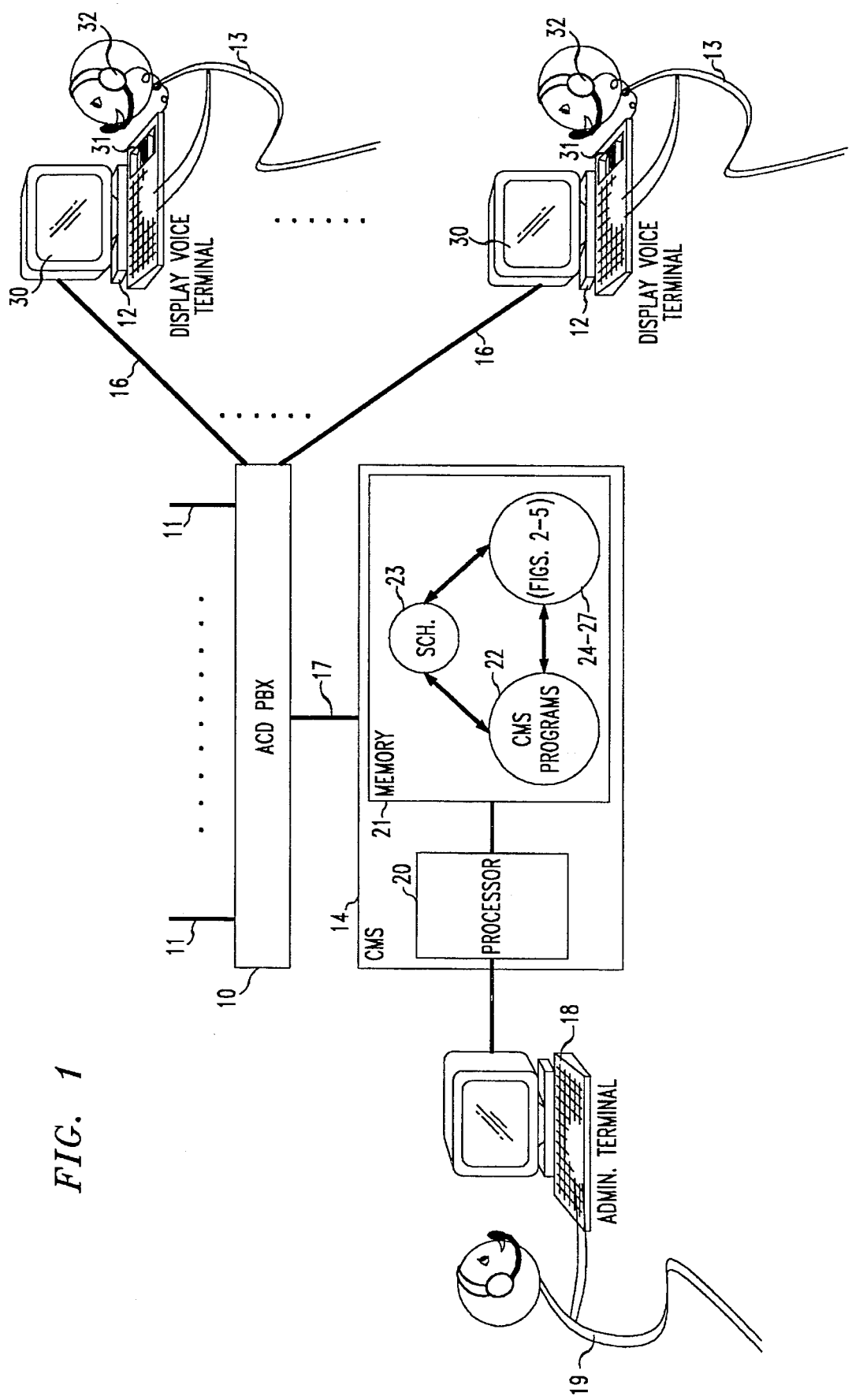
FIG. 1 is a block diagram of an automatic call-distribution (ACD) system that includes an illustrative embodiment of the invention.

FIG. 1 shows an automatic call-distribution (ACD) system having a conventional architecture. It comprises an ACD private branch exchange (PBX) 10, such as an AT&T DEFINITY® G1 or G2 executing conventional AT&T ACD software. PBX 10 is connected to the outside world, e.g., the public telephony network, by a plurality of trunks 11. PBX 10 serves a plurality of ACD agent terminals 12 staffed by ACD agents 13. PBX 10 is connected to each terminal 12 by a digital link 16, such as an ISDN or an AT&T DCP link, which carries both voice and data communications. Also connected to PBX 10 is a call-management system (CMS) 14, such as an AT&T CMS. The connection is via a control communications link 17, such as an AT&T DCIU or ASAI link. An administration terminal 18 is connected to CMS 14. An ACD system supervisor 19 interfaces with CMS 14 via terminal 18.

CMS 14 is a computer-implemented system. It comprises a processor 20 executing programs out of a memory 21. Included among the programs in memory 21 are conventional CMS programs 22, optionally a conventional scheduler (SCH.) 23, and—according to the invention—a schedule notification and adherence monitoring program 24 and other agent-interaction programs 25–27. Programs 24–27 are diagramed in FIGS. 2–5, respectively.

Figure 2:
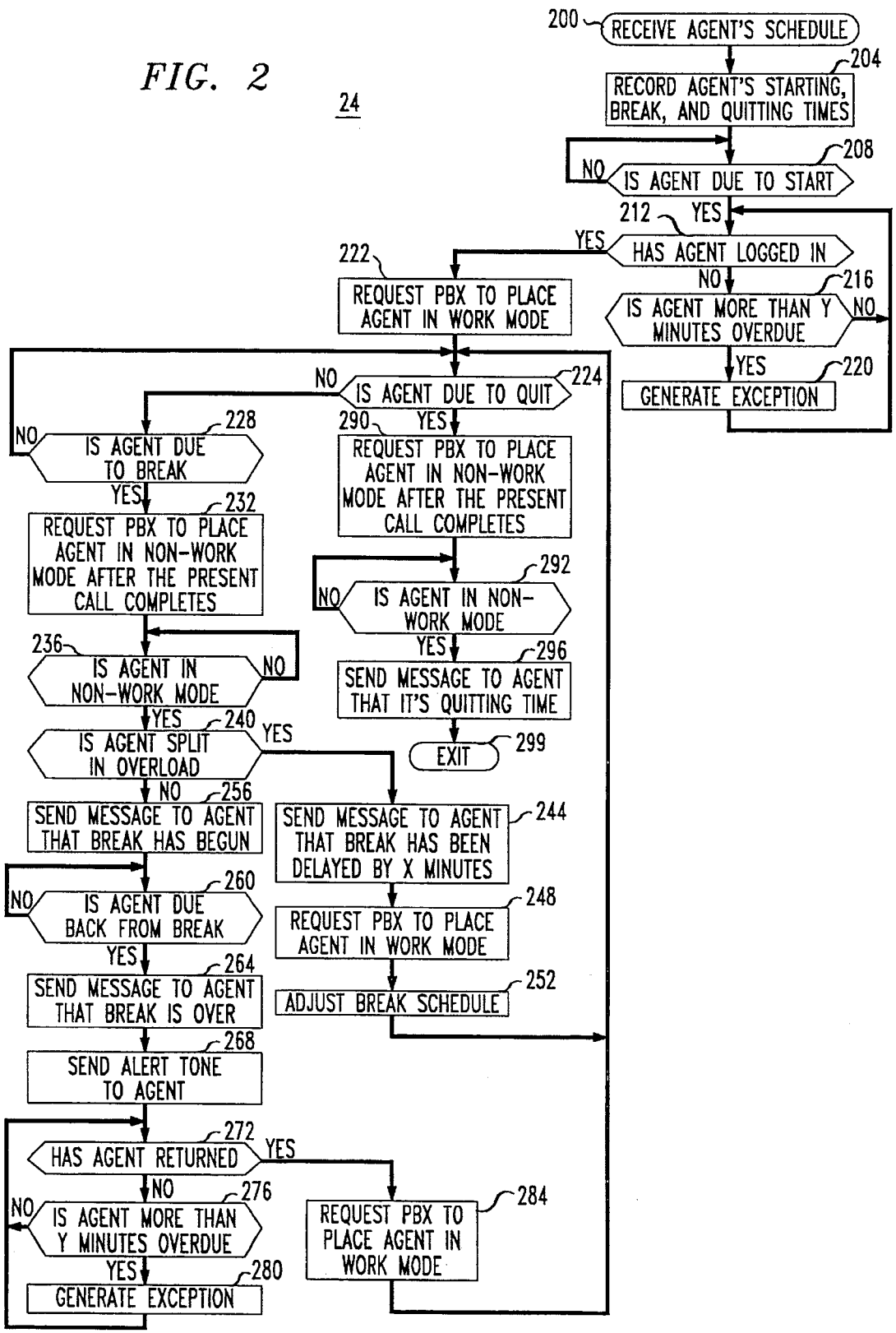
FIG. 2 is a flow diagram of an agent schedule-notification and schedule-adherence-monitoring program of a CMS system of the ACD system of FIG. 1.

Illustratively, CMS 14 runs a copy of program 24 of FIG. 2 as a separate process for each agent 13. Execution of a program 24 is invoked in response to receiving the schedule of an agent 13, either from supervisor 19 via administrative terminal 14 or from scheduler 23, at step 200. Executing program 24 records, for example in the form of scheduled interrupts or wakeup calls, the action points of this schedule, such as starting time, break times, and quitting times, at step 204. Program 24 then check whether the corresponding agent 13 is due to start, at step 208, and if not, program 24 returns to step 208. Alternatively, the check of step 208 is replaced by a wakeup call or interrupt at the agent's starting time.

If it is determined at step 208 that agent 13 is due to start, program 24 queries CMS programs 22 whether they have a record of agent 13 having logged in yet, at step 212. If not, program 24 checks whether agent 13 is more than a predetermined number (Y) of minutes overdue, at step 216. If not, program 24 returns to step 212; if so, program 24 causes CMS programs 22 to generate an exception reporting that agent 13 is overdue, at step 220, and then returns to step 212.

If and when agent 13 is found at step 212 to have logged in, program 24 sends a request to PBX 10 via CMS programs 22 to place agent 13 in work mode, at step 222. Program 24 then checks whether agent 13 is due to quit, at step 224, and if not, checks whether agent 13 is due to break, at step 228. If agent 13 is not scheduled to break, program 24 returns to step 224. Alternatively, the check of each step 224 and 228 is replaced by a wakeup call or interrupt at the quitting and break times, respectively.

When agent 13 is determined to be due to go on break at step 228, program 24 requests PBX 10 via CMS programs 22 to place agent 13 in non-work mode after completion of any call which agent 13 is presently handling, at step 232. Program 24 then queries CMS programs 22 to determine whether agent 13 has yet been placed in non-work mode, at step 236, and if not, program 24 returns to step 236. Alternatively, the check of step 236 is replaced by a wakeup call or interrupt issued by CMS programs 22 upon agent 13 being placed in non-work mode.

When agent 13 is determined at step 236 to have been placed in non-work mode, program 24 checks with CMS programs 22 to determine if the agent split of which agent 13 is a part is presently overloaded with work, at step 240. If so, program 24 sends a display message to agent 13, via CMS programs 22, PBX 10, and display 30 of that agent's terminal 12, informing agent 13 that his or her break has been delayed by a predetermined number (X) of minutes, at step 244. Program 24 then requests PBX 10 via CMS program 22 to place agent 13 back in work mode, at step 248, and also adjusts the recorded break schedule for agent 13 to reflect the new scheduled break time, at step 252. Program 24 then returns to step 224.

Returning to step 240, if it is there determined that the agent's split is not overloaded, program 24 sends a voice and/or display message to agent 13, via CMS programs 22 and PBX 10, that the agent's break has begun. The message is either displayed to agent 13 on display 30 of his or her terminal 12 or voiced to agent 13 via his or her headphone 32. Program 24 then checks whether agent 13 is due back from break, at step 260, and if not, program 24 returns to step 260. Alternatively, the check of step 260 is replaced by a wakeup call or an interrupt issued when the scheduled break period expires.

When agent 13 is found at step 260 to be due back from break, program 24 sends a display message to agent 13 via CMS programs 22 and PBX 10 informing him or her that the break is over, at step 264. Program 24 further causes PBX 10 via CMS programs 22 to send a tone to speaker 31 of agent terminal 12 to alert agent 13 to the incoming display message, at step 268. Program 24 then checks with CMS programs 22 to determine whether agent 13 has returned from break, at step 272. Illustratively, program 24 checks whether CMS programs 22 have received an indication that an non-work button has been depressed on that agent's terminal 12 which cancels a previous activation of the non-work feature. If it is determined at step 272 that agent 13 has not returned to work, program 24 determines whether agent 13 is more than a predetermined number (Y) of minutes overdue, at step 276. If not, program 24 returns to step 272; if so, program 24 causes CMS programs 22 to generate an exception to record this fact, at step 280, and then returns to step 272.

If and when it is determined at step 272 that agent 13 has returned to work, program 24 requests PBX 10 via CMS programs 22 to place agent 13 back in work mode, at step 284. Program 24 then returns to step 224.

When it is determined at step 224 that agent 13 is due to quit, program 24 requests PBX 10 to place agent 13 in non-work mode upon completion of any call presently being handled by agent 13, at step 288. Program 24 then queries CMS programs 22 to determine whether agent 13 has yet been placed in non-work mode, at step 292, and if not, program 24 returns to step 292. Alternatively, the check at step 292 is replaced by a wakeup call or interrupt issued by CMS programs 22 upon agent 13 being placed in non-work mode.

When agent 13 is detected at step 292 to have been placed in non-work mode, program 24 causes a display message to be sent to terminal 12 of agent 13 informing him or her that it is quitting time; at step 296. Program 24 then exists execution, at step 299.

Figure 3:
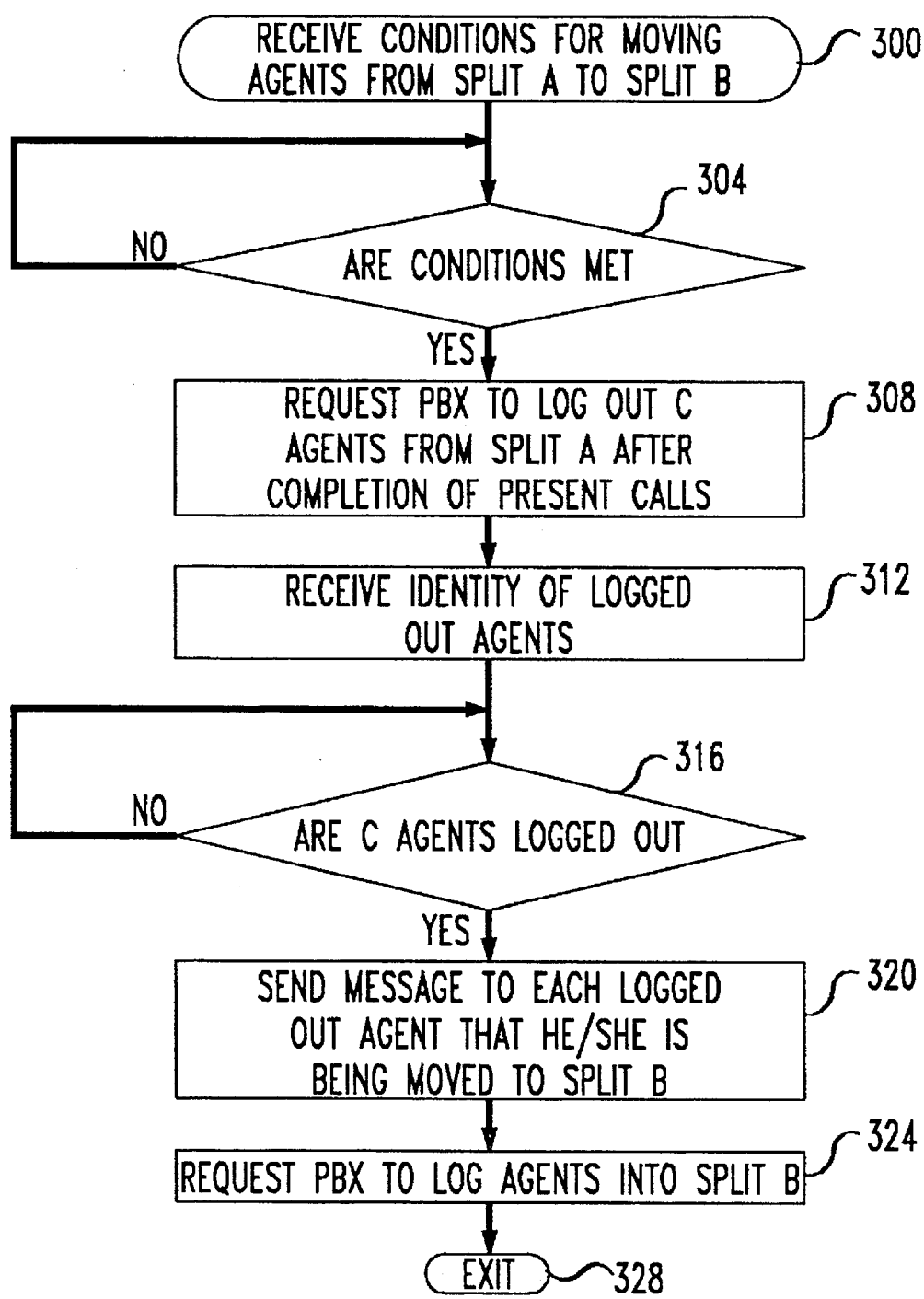
FIG. 3 is a flow diagram of an agent-move program of the CMS system of the ACD system of FIG. 1.

When a need arises to move an agent 13 from one ACD agent split to another, program 25 of FIG. 3 is executed. Program 25 is invoked in response to supervisor 19 entering, via administration terminal 14, the conditions upon the occurrence of which one or more agents 13 should be moved from one split (A) to another split (B) and how many (C) agents 13 should be moved. Program 25 receives these conditions, at step 300, and begins to monitor output of CMS programs 22 to determine if these conditions are met, at step 304. When it determines that the conditions have been met, program 25 sends a message via CMS programs 22 to PBX 10 requesting it to log C agents 13 out of split A at the completion of any calls presently being handled by those agents 13, at step 308. It then monitors CMS programs 22 to obtain the identity of the C agents 13 which PBX 10 has logged out of split A at step 312. When it determines, at step 316, that it has the identity of C agents 13, program 25 causes a visual message to be sent to each one of those agents 13 informing them that they are being moved to split B, at step 320. Program 25 then requests PBX 10 to log those C agents 13 into split B, at step 324, and exits execution, at step 328.

Figure 4:
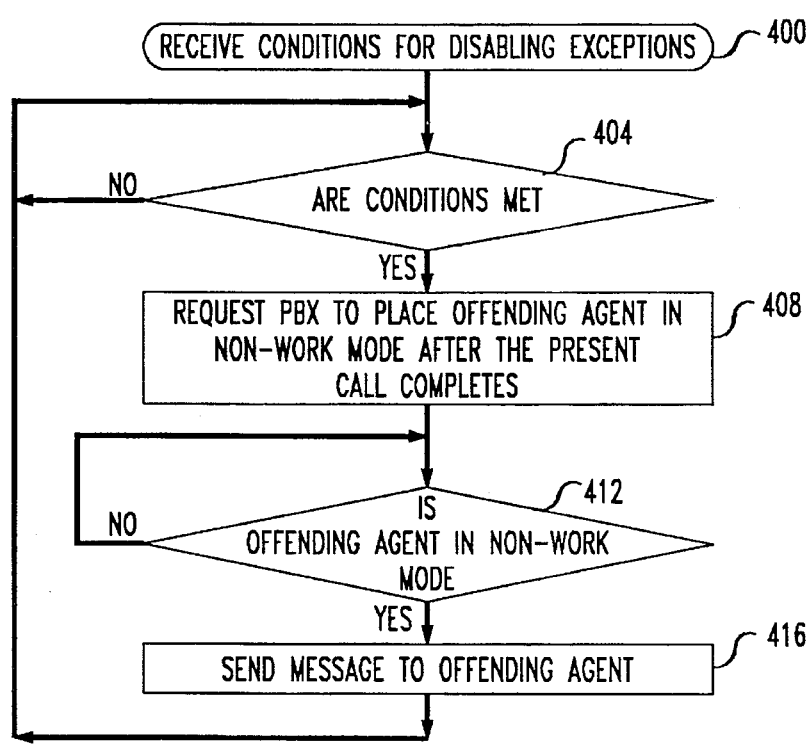
FIG. 4 is a flow diagram of an agent-disable program of the CMS system of the ACD system of FIG. 1.

Program 26 of FIG. 4 is invoked when supervisor 19 decides that certain exceptions to proper operation should disable any offending agent 13 from handling calls. Supervisor 19 enters, via terminal 14, the conditions that define which, and how many, exceptions should disable an agent 13. Program 26 receives these conditions, at step 300, and begins to monitor the output of CMS programs 22 for occurrence of these conditions, at step 404. When it determines that the conditions have been met by an agent 13, program 26 requests PBX 10 to place the offending agent 13 in non-work mode following completion of any call presently being handled by offending agent 13, at step 408.

When the offending agent 13 has been placed in non-work mode, as determined at step 412, program 26 sends a visual message to offending agent 13, at step 416, informing him or her of the fact that he or she has been disabled. Optionally, the message also informs offending agent 13 of the exceptions which caused the disablement, and directs offending agent 13 to report to supervisor 19. Program 26 then returns to step 404.

Figure 5:
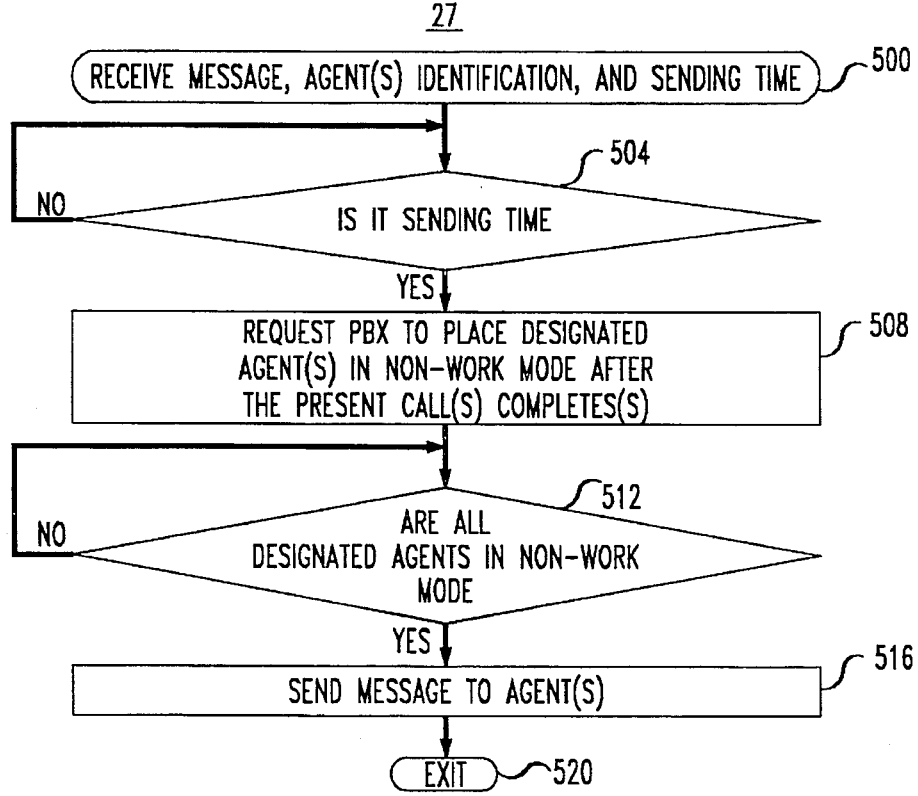
FIG. 5 is a flow diagram of an agent-messaging program of the CMS system of the ACD system of FIG. 1.

Program 27 of FIG. 5 is executed when supervisor 19 unconditionally wishes to send a message to one or more agents 13. Supervisor 19 inputs the message on terminal 14, identifies the one or more agents 13 to whom it should be sent, and specifies the time at which it should be sent. In response to receiving this input, at step 500, program 27 begins to monitor real time for occurrence of the sending time, at step 504. Alternatively to the check of step 504, program 27 is issued a wakeup call at the sending time. When the sending time occurs, program 27 sends a request to PBX 10 to place the designated one or more agents 13 in non-work mode at completion of any calls presently being handled by those agents 13, at step 508. When all designated agents 13 have been placed in non-work mode, as determined at step 512, program 27 sends the supervisor's message in visual form to display 30 of terminals 12 of the designated agents 13, at step 516. Program 27 then exits execution, at step 520.

Of course, it should be understood that various changes and modifications to the illustrative embodiment described above will be apparent to those skilled in the art. For example, these flow chaffs of the figures are only a representation of an illustrative implementation; an actual implementation in a CMS architecture or another multi-tasked programming environment may be different. Such changes and modifications can be made without departing from the spirit and the scope of the invention and without diminishing its attendant advantages. It is therefore intended that all such changes and modifications be covered by the following claims.

I claim:

1. An arrangement for a call center having a plurality of telecommunications terminals staffed by agents, comprising:

means responsive to an agent's schedule which includes predetermined events scheduled for predetermined times, for communicating each said event at its scheduled time to the agent via the agent's corresponding terminal; and means cooperative with the communicating means, for monitoring the agent's performance of the communicated event at the scheduled time via the agent's input into the agent's corresponding terminal.

2. The arrangement of claim 1 implemented in a call-management system of the call center.

3. The arrangement of claim 1 for a call center having a processor-implemented call management system, wherein:

the communicating means and the monitoring means both comprise a program stored for execution on the call management system processor.

4. The arrangement of claim 1 wherein:

the means for communicating each said event comprise means for causing at least one of an audio signal generator and a visual signal generator of the agent's corresponding terminal to generate at least one of an audio signal and a visual signal, respectively, to alert the agent to occurrence of the scheduled time for each said event.

5. The arrangement of claim 1 wherein:

the means for communicating each said event comprise means for sending a display message indicating each said event at its scheduled time to a display of the agent's corresponding terminal.

6. The arrangement of claim 5 wherein:

the means for communicating each said event further comprise means for causing a speaker of the agent's corresponding terminal to produce an auditory signal when the display message is displayed on the display of the terminal.

7. The arrangement of claim 1 wherein:

the means for communicating each said event comprise:

means for selectively causing the call center to place the agent in a non-work state substantially at the scheduled time.

8. The arrangement of claim 1 wherein:

the means for monitoring comprise means responsive to detection of the agent's performance of the communicated event for selectively causing the call center to place the agent in a work state.

9. The arrangement of claim 1 wherein:

the means for monitoring comprise means responsive to detection of the agent's failure to perform the communicated event substantially at the scheduled time for causing the call center to register an exception against the agent.

10. An arrangement for a call center having a plurality of telecommunications terminals staffed by agents, comprising:

means for communicating an agent's schedule to the agent via the agent's corresponding terminal;

means cooperative with the communicating means, for monitoring the agent's adherence to the communicated schedule via the agent's corresponding terminal; and means responsive to receipt of a message and an identification of at least one agent intended to receive the message, for sending the received message to the identified at least one agent via the identified at least one agent's corresponding terminal.

11. An arrangement for a call center having a plurality of telecommunications terminals staffed by agents, comprising:

means for communicating an agent's schedule to the agent via the agent's corresponding terminal;

means cooperative with the communicating means, for monitoring the agent's adherence to the communicated schedule via the agent's corresponding terminal;

means responsive to receipt of criteria for moving an agent from one agent split to another, for monitoring the call center for occurrence of the received criteria; and means responsive to detection of occurrence of the received criteria, for moving an agent from the one split to the other split.

12. An arrangement for a call center having a plurality of telecommunications terminals staffed by agents, comprising:

means for communicating an agent's schedule to the agent via the agent's corresponding terminal;

means cooperative with the communicating means, for monitoring the agent's adherence to the communicated schedule via the agent's corresponding terminal;

means responsive to detection of the agent's failure to adhere to the communicated schedule, for causing the call center to register an exception against the agent;

means responsive to receipt of information characterizing exceptions meriting disablement of an agent, for monitoring the call center for registration of the characterized exceptions; and means responsive to detection of registration of the characterized exceptions, for causing the call center to place in a non-work state an agent against whom the characterized exceptions were registered.

13. An arrangement for a call center having a plurality of telecommunications terminals staffed by agents, comprising:

means responsive to an agent's schedule which includes predetermined breaks scheduled for predetermined times, for determining at each scheduled break time whether an agent split to which the agent belongs is overloaded with work;

means responsive to a first determination at an individual predetermined time that the agent split is overloaded, for rescheduling the corresponding break to another time;

means responsive to said first determination for sending a message to the agent via a display of the agent's corresponding terminal that the break has been rescheduled;

means responsive to a second determination at an individual predetermined time that the agent split is not overloaded, for causing the call center to place the agent in a non-work state;

means responsive to the second determination for sending a message to the agent via the display informing the agent to go on break;

means responsive to the second determination and to expiration of a predetermined break period following the individual predetermined time, for sending a message to the agent via the display informing the agent to go off break;

means responsive to detection, from the agent's input on the agent's corresponding terminal, that the agent has gone off break within a predetermined time period following expiration of the predetermined break period, for causing the call center to place the agent in a work state; and means responsive to detection, from lack of the agent's said input on the agent's corresponding terminal, that the agent has not gone off break within the predetermined time period following expiration of the predetermined break period, for causing the call center to register an exception against the agent.

14. A method of communicating with agents in a call center having a plurality of telecommunications terminals staffed by the agents, comprising the steps of:

in response to an agent's schedule which includes predetermined events scheduled for predetermined times, communicating each said event at its scheduled time to the agent via the agent's corresponding terminal; and monitoring the agent's performance of the communicated event at the scheduled time via the agent's input into the agent's corresponding terminal.

15. The method of claim 14 wherein:

the step of communicating comprises the step of communicating the agent's schedule to the agent from a call-management system of the call center; and the step of monitoring comprises the step of monitoring the agent's adherence to the communicated schedule at the call-management system.

16. The method of claim 14 in a call center having a processor-implemented call management system, wherein:

the step of communicating comprises the step of executing a stored program on the call-management system processor to communicate each said event at its scheduled time to the agent; and the step of monitoring comprises the step of executing a stored program on the call management system processor to monitor the agent's performance of the communicated event at the scheduled time.

17. The method of claim 14 wherein:

the step of communicating each said event comprises the step of causing at least one of an audio signal generator and a visual signal generator of the agent's corresponding terminal to generate at least one of an audio signal and a visual signal, respectively, to alert the agent to occurrence of the scheduled time for each said event.

18. The method of claim 14 wherein:

the step of communicating each said event comprises the step of sending a display message indicating each said event at its scheduled time to a display of the agent's corresponding terminal.

19. The method of claim 18 wherein:

the step of communicating each said event further comprises the step of causing a speaker of the agent's corresponding terminal to produce an auditory signal when the display message is displayed on the display of the terminal.

20. The method of claim 14 wherein:

the step of communicating each said event comprises the step of selectively causing the call center to place the agent in a non-work state substantially at the scheduled time.

21. The method of claim 14 wherein:

the step of monitoring comprises the step of in response to detection of the agent's performance of the communicated event, selectively causing the call center to place the agent in a work state.

22. The method of claim 14 wherein:

the step of monitoring comprises the step of in response to detection of the agent's failure to perform the communicated event substantially at the scheduled time, causing the call center to register an exception against the agent.

23. A method of communicating with agents in a call center having a plurality of telecommunications terminals staffed by the agents, comprising the steps of:

communicating an agent's schedule to the agent via the agent's corresponding terminal;

monitoring the agent's adherence to the communicated schedule via the agent's corresponding terminal; and in response to receipt of a message and an identification of at least one agent intended to receive the message, sending the received message to the identified at least one agent via the identified at least one agent's corresponding terminal.

24. A method of communicating with agents in a call center having a plurality of telecommunications terminals staffed by the agents, comprising the steps of:

communicating an agent's schedule to the agent via the agent's corresponding terminal;

monitoring the agent's adherence to the communicated schedule via the agent's corresponding terminal;

in response to receipt of criteria for moving an agent from one agent split to another, monitoring the call center for occurrence of the received criteria; and in response to detection of occurrence of the received criteria, moving an agent from the one split to the other split.

25. A method of communicating with agents in a call center having a plurality of telecommunications terminals staffed by the agents, comprising the steps of:

communicating an agent's schedule to the agent via the agent's corresponding terminal;

monitoring the agent's adherence to the communicated schedule via the agent's corresponding terminal;

is response to detection of the agent's failure to adhere to the communicated schedule, causing the call center to register an exception against the agent;

in response to receipt of information characterizing exceptions meriting disablement of an agent, monitoring the call center for registration of the characterized exceptions; and in response to detection of registration of the characterized exceptions, causing the call center to place in a non-work state an agent against whom the characterized exceptions were registered.

26. A method of communicating with agents in a call center having a plurality of telecommunications terminals staffed by the agents, comprising:

in response to an agent's schedule which includes predetermined breaks scheduled for predetermined times, determining at each scheduled break time whether an agent split to which the agent belongs is overloaded with work;

in response to a first determination at an individual predetermined time that the agent split is overloaded, rescheduling the corresponding break to another time;

in response to said first determination, sending a message to the agent via a display of the agent's corresponding terminal that the break has been rescheduled;

in response to a second determination at an individual predetermined time that the agent split is not overloaded, causing the call center to place the agent in a non-work state;

in response to the second determination, sending a message to the agent via the display informing the agent to go on break;

in response to the second determination and to expiration of a predetermined break period following the individual predetermined time, sending a message to the agent via the display informing the agent to go off break;

in response to detection, from the agent's input on the agent's corresponding terminal, that the agent has gone off break within a predetermined time period following expiration of the predetermined break period, causing the call center to place the agent in a work state; and in response to detection, from lack of the agent's said input on the agent's corresponding terminal, that the agent has not gone off break within the predetermined time period following expiration of the predetermined break period, causing the call center to register an exception against the agent.

* * * * *